Patented Sept. 21, 1926.

1,600,514

UNITED STATES PATENT OFFICE.

SPERANZA SEAILLES, née CALOGEROPOULOS, AND JEAN SEAILLES, OF PARIS, FRANCE, ASSIGNORS, BY DIRECT AND MESNE ASSIGNMENTS, TO ALFRED P. BOURQUARDEZ, OF NEW YORK, N. Y.

PROCESS FOR OBTAINING PIECES OF CEMENT WITH POLISHED OR HALF-POLISHED SURFACES AND THE PRODUCT THEREOF.

No Drawing. Application filed January 17, 1924, Serial No. 686,928, and in France June 16, 1923.

The present invention has for object first of all the production of parts or pieces of cement having a polished surface that is to say a bright surface similar to that of the ceramic pieces, this result being obtained in a cold way, without adjoined coating, without varnish nor paint.

The process consists in casting or running the cement over an enamelled or polished surface such as glass, porcelain, metals which cannot be attacked by the cement, and the like, and in leaving the cement in contact with said surface during a period which, corresponding to the cementing or first hardening, is sufficient for allowing the cement to have by itself a polished surface after it has been removed from the mould.

This process can be carried out in starting from aluminous (acid) cements with quick holding and hardening which are left in contact with the polished or enamelled surface during a period of about twelve to eighteen hours for example. It is then possible to obtain moulded parts whose surface has a perfect polish or brightness which can be compared with that resulting from vitrification.

On the contrary, if use is made of ordinary hydraulic cements, (basic cements, natural or artificial Portland cements, calcareous—hydraulic—binding agents) whose first hardening is usually slower, it is necessary to leave them in contact with polished surfaces upon which they are cast for a much longer time, for example from three to five days and it is then possible to obtain pieces or parts having a half-polished surface, that is to say, comprising polished or bright places alternating with smooth or dull surfaces.

It is to be observed that if it had been required to remove from the moulds these ordinary nonaluminous cements after a shorter period, for example from twelve to eighteen hours, as such is the case with aluminous cements, the pieces which would have been obtained would not have been polished but would have been smooth and dull.

The cement used according to the process which has just been mentioned can be reinforced or not and made of fibrous texture through admixture of asbestos or through any other known means.

In order to carry out the process forming the object of the invention, one can make use of a mould the walls of which are formed of materials possessing, according to their nature, or having imparted thereto by a suitable treatment, a surface which is as perfectly polished or enamelled as possible; for instance surfaces composed of glass of convenient shape, enamelled terra cotta or baked clay, varnished sand-stone, marble, mica, or still polished metal, and the like.

It is also possible to constitute or coat the mould with more plastic products such as linoleums, celluloids, collodiums, varnishes, materials used for making the photographic films, and, generally speaking, the similar products.

In the same way, it will also be possible to use a hard matter of any kind coated with a suitable varnish, such as celluloid, acetate of cellulose, and the like, which will be particularly useful for the moulds of complicated shape which can then be made by any well known process and namely in plaster or gypsum. It is still possible to obtain excellent results in coating the mould with this metal paper (such as tin-foil) which gives satisfactory results.

The mould being thus constituted, the aluminous cement is introduced therein, the same being of suitable consistence and in suitable quantity, according to the form of the moulds and the purpose for which the pieces or parts are intended, the consistence varying between that of slightly plastic mortars and very fluid mortars and the proportioning varying between that of pure cement and that of rich mortars as far as that of the ordinary mortar and gravel concretes, simply according to the resistance and the appearance to be obtained.

The manufacture can also be effected in the most cases in superposed layers, the superficial or surface layer being thin and rich and the filling made of more or less rough material.

When the material is in position in the mould, it is possible to eliminate the superficial air bubbles, and to give a good compactness to the material either by vibration or repeated shocks, or by putting under vacuum, or by the two processes combined. It is also possible to make use of the known processes such as compression, ramming, and the like, but this is not unavoidable.

The setting and first hardening are then allowed to take place in the mould and when removing from the mould, pieces are obtained having a surface whose appearance shows a polish or an enamel which is quite similar to that of the wall of the mould, so that for example a plate prepared on a glass ground or plate will have, after it is removed from the glass plate and for a not acquainted person, the same appearance as if it would be covered with a protecting glass, with this advantage that as the enamel is superficial the defects existing in the thickness do not appear, as such is the case with a glass or even a thick varnish.

It is possible to embody with the aluminous cement suitable dye-stuffs without impairing the result and the quality of the surface, either in a thin superficial coating first cast or run, or in the whole of the mass.

It has also been observed that if the surface of the mould be decorated with suitable colours or paints diluted in water, either alone, or mixed before being applied with a certain quantity of aluminous cement and water and eventually fine sand, a decorated surface is obtained which allows to obtain all the fineness of ornamentation or decoration which is desired and which it is easy to obtain with the brush or with the pad, and the like in order to obtain all the decorative effects of the ornamental, easel or fresco painting. In this case it is advantageous to powder the painted surface with dry cement before proceeding to the casting operation so as to avoid the spoiling of the colours or the chafing thereof.

The colour or paint can also be thoroughly or intimately mixed with the aluminous cement and it can be proceeded through dry powdering, the whole being then covered with liquid cement or mortar.

It is also possible to decorate the surface of the mould with colour or paint without cement mixed either with water or with turpentine or a similar vehicle which evaporates more or less completely and which does not oppose itself to the setting or holding of the cement (white spirits, alcohol, and the like). Under the above described conditions of setting and first hardening, the cement penetrates through the paint or colour so that it petrifies itself and is embodied with the same with a perfect solidity; at same time, as the paint is used without mixture of cement which would tarnish the shade and is fixed through hardening to the surface of the cement itself, this gives a colouring of a considerable pureness which, combined with the polish of the surface, produces entirely new decorative or ornamental effects which can be compared with the most beautiful shades or colours of pastel.

Moreover, if the surface thus decorated is soaked after hardening with oil or other fatty matter, this treatment gives to the paint a bright and new intensity without external varnishing.

It is to be observed that the use of turpentine or other vehicles or carriers, such as the white spirits, the alcohols and the like ..., allows to compose with the paint products possessing an oiliness similar to that of certain inks so that the printing processes as known at present can be used in connection with the moulds into which the cement is to be run. It is finally possible to use the well known process for making cement flags or paving-tiles by means of matrixes or compartments which are filled with a mixture of cement and paint, but it will be observed that it is possible here to obtain; 1°—the directly enamelled surface, 2°—a perfect appearance and quality without pressing or ramming.

Finally, an interesting means consists in placing into the mould decorative elements which have been prepared beforehand, either by the process as described, or in forming the same with any decorative matters (marbles, ceramic, sandstone, metal and the like), and in then running the coating cement which causes the pieces thus enchased to appear on a ground of enamelled and polished nature of a new decorative effect. The ground can be plain or coloured at will and eventually decorated also by the above described means, thereby allowing to limit the mosaic parts to their ornamental purpose without being bound to coat the whole of the surface which is to be ornamentated whereas the ground itself will have, through a mere running, a suitable ornamental character. Another means for decorating the surface of the cement consists, in the case of hydraulic cements having a variable chemical composition and containing namely a more or less large proportion of alumina (for instance from the slightly aluminous Portland cements up to the most aluminous Portlands and the properly called aluminous cements), in mixing with these cements loading products such as sands broken or crushed stones, metal waste products, fibres and asbestos dust, and similar products. The applicants have found out that the mixture of these products with the cement (according to the nature and the proportion of the matters mixed with the cement and according to the chemical composition and namely the more or less large proportion of alumina and other constituents existing in the mixture) has the property of giving a surface naturally decorated with marblings, designs, shagreen, stripes, or crystallization, the effects of which can be unlimitedly and at will varied in selecting the required mixture and in adding, if necessary, to the selected mixture, suitable dye-stuffs which allow the production of the natural decoration but modify the shade and the appearance thereof. When a painted decoration is made, the ground itself will present the natural decoration thereby imparting to the products obtained particular properties of appearance or aspect.

It has also been found that it was possible to manufacture by means of the well known processes of centrifugation in a mould having polished or enamelled walls according to the process as described and to obtain by the use of this process enamelled parts or pieces in causing a mould which has been constituted in this way to revolve rapidly. Under these conditions, the required removal of the air bubbles and of the excess of water is effected and if the parts are removed from the mould after the hardening has taken place, the hereinbefore provided result will be obtained.

The surfaces of polished or half-polished cement, as above described, are practically impervious or water-proof which means that if a drop of water is laid over them, the same will not be absorbed but will slowly evaporate, without however penetrating to the interior through this practically impervious coating; it has been found that the liquids, wet but to a very small depth this same superficial polished and practically impervious surface which, in some cases, may constitute a disadvantage, although this wetting will rapidly disappear from itself through evaporation.

In order to do away with this phenomenon, the surface can be coated either with a cold fatty liquid like crude or baked linseed-oil or any other oil, or with a molten fatty body like stearin, paraffin, or any other fatty matter, or with a fatty body or an oil which is dissolved in a solvent, and the like. This substance is allowed to penetrate for a suitable time according to the product which is used, and the excess which remains over the surface and which no longer penetrates is wiped off.

Under these conditions, there is a slight penetration of the superficial coating which is rendered entirely impervious, although it is not coated with any external coating acting as a varnish or a preserving coating whereas the whole of the matter in excess has been wiped off. The polished or enamelled superficial surface can no longer get wet and the liquids flow and slide over the same without leaving thereon any trace, even momentaneously.

Furthermore, the added body, having penetrated into the capillar cavities or recesses, acquires the property of being no longer destroyed by the cement, as such is the case when a cement with unpolished or unenamelled surface is covered with a layer or coating of oil, as it is well known that in such a case the oil saponifies and is converted into dust.

The above described process allows to make a great number of industrial or artistical products, among which the following may be mentioned:

1°—The production of artificial building stones with polished or enamelled face, either by means of a thin coating under a mass of a different nature, or by means of an homogeneous mass;

2°—The application in order to impart their appearing finish to moulded cement parts such as cases, bannisters, candelabrums, and the like;

3°—The production of more or less thin dressing or facing plates as a substitution for marble, slate, stucco, and the like;

4°—The production of facing or paving flags;

5°—The production of panels bearing inscriptions as a substitution for the plates of sheet-iron or enamelled metal;

6°—Their use in connection with artistical decoration or ornamentation so as to obtain a product having a resistance and a quality which are incomparatively superior to the fresco painting processes as used at present.

All the applications of the above described process give satisfactory results with the hydraulic cements generally speaking, but particularly exceptional results with the aluminous cements.

What we claim is:

1. The process for obtaining pieces or parts of cement having a glossy surface, which consists in casting aluminous cement over an enameled or polished surface and leaving it in contact with said surface during a time corresponding to the setting and first hardening.

2. The process for obtaining pieces or parts of cement having a glossy surface, which consists in casting aluminous cement over an enameled or polished surface and leaving it in contact with said surface from twelve to eighteen hours.

3. The process for obtaining pieces or parts of cement having a glossy surface which consists in casting aluminous cement in molds provided with convenient polished internal coatings and leaving it in said mold from twelve to eighteen hours.

4. The process for obtaining pieces or parts of cement having a glossy surface which consists in casting aluminous cement in molds provided with convenient polished internal coatings, submitting the molds to vibrations and setting under vacuum, removing the air bubbles from the mold, and leaving it in said mold from twelve to eighteen hours.

5. The process which consists in casting aluminous cement containing load products such as sand, broken or crushed stones, metal waste products, fibers or asbestos dust into molds provided with convenient polished internal coatings and leaving it in said mold from twelve to eighteen hours.

6. The process which consists in depositing paint upon the surface of a mold provided with convenient polished internal coatings, casting aluminous cement into said mold and leaving it there during a time corresponding to the setting and initial hardening.

7. The process for obtaining pieces or parts of cement having a glossy surface, which consists in casting aluminous cement over an enameled or polished surface, leaving it in contact with said surface from twelve to eighteen hours, unmolding the pieces and treating them with oily or fatty bodies so as to penetrate them.

8. The process which consists in depositing paint upon the surface of a mold provided with convenient polished internal coatings, casting aluminous cement in said mold, leaving it there from twelve to eighteen hours, to unmold the pieces and then treating them with oily or fatty bodies so as to penetrate them.

9. The process which consists in disposing upon the walls of a mold with polished internal coatings, decorative elements, casting aluminous cement into the mold and leaving it there from twelve to eighteen hours.

10. As a new article of manufacture, pieces of aluminous cement having a bright and glossy surface obtained by simple casting in a mold and unmolding after a time corresponding to the setting and initial hardening.

11. The process for obtaining cement products having a smooth surface which consists in casting a composition comprising aluminous cement in a mold having a smooth or polished surface and removing the same from the mold after the initial setting and hardening.

12. The process for obtaining cement products having a smooth surface which consists in casting a composition comprising aluminous cement in a mold having a smooth or polished surface, submitting the mold to vibrations, and removing the casting from the mold after initial setting and hardening.

13. As a new article of manufacture, aluminous cement products having a smooth surface obtained by simple casting in a mold having a smooth or polished surface and unmolding only after a time corresponding to the setting and initial hardening.

14. As a new article of manufacture, aluminous cement products having a smooth surface obtained by simple casting in a mold having a smooth or polished surface, submitting the mold to vibration and unmolding only after a time corresponding to the setting and initial hardening.

In testimony whereof we have signed this specification.

Mrs. SÈAILLES, née SPERANZA CALOGÈROPOULOS.
JEAN SÈAILLES.